(12) United States Patent
Dobsky

(10) Patent No.: US 7,768,258 B2
(45) Date of Patent: Aug. 3, 2010

(54) PROXIMITY PROBE TRANSMITTER

(75) Inventor: David Dobsky, Houston, TX (US)

(73) Assignee: Metrix Instrument Co., L.P., Houston, TX (US)

( * ) Notice: Subject to any disclaimer, the term of this patent is extended or adjusted under 35 U.S.C. 154(b) by 0 days.

(21) Appl. No.: 11/516,439

(22) Filed: Sep. 6, 2006

(65) Prior Publication Data

US 2008/0054891 A1  Mar. 6, 2008

(51) Int. Cl.
*G01R 33/12* (2006.01)
(52) U.S. Cl. .............................. 324/207.26; 324/207.16; 324/207.12
(58) Field of Classification Search ............ 324/207.16, 324/207.26, 207.12
See application file for complete search history.

(56) References Cited

U.S. PATENT DOCUMENTS 5,854,553 A * 12/1998 Barclay et al. ......... 324/207.16
6,819,122 B2 * 11/2004 Slates ......................... 324/699
7,141,985 B2 11/2006 Zusman

* cited by examiner

*Primary Examiner*—Reena Aurora
(74) *Attorney, Agent, or Firm*—Caesar, Rivise, Bernstein, Cohen & Pokotilow, Ltd.

(57) ABSTRACT

A digital based two wire proximity transmitter system and a method for calibrating the system, wherein the transmitter includes a customized linearization table uniquely generated during calibration to take into account the unique impedance properties of a particular probe/coaxial cable configuration. During calibration, the probe is positioned adjacent a calibration target. The calibration target is selected to have the same material characteristics as the target to be monitored during actual operation of the transmitter in the field. At a fixed distance between the probe and calibration target, the resonant frequency of the probe/cable system is determined. Thereafter, utilizing this resonant frequency to excite the probe, the voltage response of the probe/cable system is determined as the distance between the probe and the target material is incrementally changed. The voltage output is used to build a table for incremental distances, wherein each distance is characterized by a non-linear output that has been equated to a linear output. This uniquely generated table is subsequently downloaded into the transmitter for reference during monitoring.

11 Claims, 5 Drawing Sheets

| C | B | | D |
|---|---|---|---|
| | InputBits | InputVolts | OutputBits | OutputVolts |
| 1846 | 1846 | 1.126709 | 980 | 0.5981 |
| 1847 | 1847 | 1.127319 | 981 | 0.5987 |
| 1848 | 1848 | 1.12793 | 981 | 0.5987 |
| 1849 | 1849 | 1.12854 | 982 | 0.5993 |
| 1850 | 1850 | 1.12915 | 983 | 0.5999 |
| 1851 | 1851 | 1.129761 | 984 | 0.6005 |
| 1852 | 1852 | 1.130371 | 985 | 0.6011 |
| 1853 | 1853 | 1.130981 | 986 | 0.6018 |
| 1854 | 1854 | 1.131592 | 987 | 0.6024 |
| 1855 | 1855 | 1.132202 | 988 | 0.6030 |
| 1856 | 1856 | 1.132812 | 989 | 0.6036 |
| 1857 | 1857 | 1.133423 | 990 | 0.6042 |
| 1858 | 1858 | 1.134033 | 992 | 0.6054 |
| 1859 | 1859 | 1.134644 | 993 | 0.6060 |
| 1860 | 1860 | 1.135254 | 994 | 0.6066 |
| 1861 | 1861 | 1.135864 | 995 | 0.60 |
| 1862 | 1862 | 1.136475 | 996 | 0.607 |
| 1863 | 1863 | 1.137085 | 997 | 0.6085 |
| 1864 | 1864 | 1.137695 | 998 | 0.6091 |
| 1865 | 1865 | 1.138306 | 999 | 0.6097 |
| 1866 | 1866 | 1.138916 | 1000 | 0.6103 |
| 1867 | 1867 | 1.139526 | 1001 | 0.6109 |
| 1868 | 1868 | 1.140137 | 1002 | 0.6115 |
| 1869 | 1869 | 1.140747 | 1003 | 0.6121 |
| 1870 | 1870 | 1.141357 | 1004 | 0.6127 |
| 1871 | 1871 | 1.141968 | 1005 | 0.6134 |
| 1872 | 1872 | 1.142578 | 1006 | 0.6140 |
| 1873 | 1873 | 1.143188 | 1007 | 0.6146 |
| 1874 | 1874 | 1.143799 | 1009 | 0.6158 |
| 1875 | 1875 | 1.144409 | 1010 | 0.6164 |
| 1876 | 1876 | 1.14502 | 1011 | 0.6170 |
| 1877 | 1877 | 1.14563 | 1012 | 0.6176 |
| 1878 | 1878 | 1.14624 | 1013 | 0.6182 |
| 1879 | 1879 | 1.146851 | 1014 | 0.6188 |
| 1880 | 1880 | 1.147461 | 1015 | 0.6195 |
| 1881 | 1881 | 1.148071 | 1016 | 0.6201 |
| 1882 | 1882 | 1.148682 | 1017 | 0.6207 |

| A | |
|---|---|
| mils | InputBitsA |
| 25 | 1655 |
| 26 | 1696 |
| 27 | 1738 |
| 28 | 1775 |
| 29 | 1810 |
| 30 | 1850 |
| 31 | 1881 |
| 32 | 1910 |
| 33 | 1936 |
| 34 | 1959 |
| 35 | 1986 |
| 36 | 2008 |
| 37 | 2032 |
| 38 | 2055 |
| 39 | 2080 |
| 40 | 2104 |
| 41 | 2135 |
| 42 | 2155 |
| 43 | 2177 |
| 44 | 2208 |
| 45 | 2225 |
| 46 | 2247 |
| 47 | 2271 |
| 48 | 2295 |
| 49 | 2313 |
| 50 | 2334 |
| 51 | 2353 |
| 52 | 2374 |
| 53 | 2393 |
| 54 | 2410 |
| 55 | 2427 |
| 56 | 2445 |
| 57 | 2459 |
| 58 | 2474 |
| 59 | 2458 |
| 60 | 2498 |
| 61 | 2503 |
| 62 | 2519 |
| 63 | 2531 |
| 64 | 2544 |
| 65 | 2556 |

FIG. 4b

PROXIMITY PROBE TRANSMITTER

BACKGROUND OF THE INVENTION

1. Field of the Invention

The present invention relates to vibration monitoring equipment and more specifically to proximity probe sensors used to monitor vibrations in motors and shafts and to identify excessive vibrations therein.

2. Prior Art

Rotating machinery such as motors, generators, and turbines find widespread application in areas such as manufacturing, power generation, materials processing, as well as many others. Over time, such machinery is subject to wear and potential failure. Given the high operating RPM and high power dissipation of many industrial applications of such machinery, failure during operation may have severe consequences in terms of damage to the failed equipment itself as well as neighboring equipment and areas of the installation. In addition, preventive machinery shut downs for maintenance and repair can be very costly in terms of facility downtime and direct expense in labor and replacement parts.

Accordingly, it has become important in this area to provide monitoring equipment associated with such rotating machinery to provide indications of its condition. Preferably, such condition monitoring equipment can indicate when a piece of machinery is excessively worn or is otherwise operating improperly. In these instances, the affected machinery can be shut down and repaired prior to a catastrophic failure. Furthermore, such monitoring equipment can indicate when machinery is operating within a defined normal operating range, thereby eliminating unnecessary shutdowns for preventive maintenance. It can be appreciated that condition monitoring equipment employed for these purposes should quickly detect and either flag or shut down equipment subject to imminent failure, but should not unnecessarily flag or shut down equipment that is functioning properly.

Two parameters monitored by such equipment are the amplitude and frequency of the machine vibration. A typical rotating machine will have vibration at many frequencies. By monitoring both the amplitude and frequency of the machine vibration one can determine the condition of the machine as well as provide protection from catastrophic failure.

One type of condition monitoring device is a two wire proximity transmitter system that converts a non-linear eddy current signal from an eddy current probe into a linearized output suitable for conversion into a 4 to 20 mA process signal. This signal is used to indicate whether a portion of a rotating machine such as a motor or compressor is in need of repair or maintenance. It can also be used to provide protection to the machine by indicating excessive vibration levels, thus allowing an external control system to shut the machine down.

Eddy current proximity probe systems, and particularly, eddy current probes are well known for their ability to detect the position or condition of varying types of conductive materials. These probes are useful in a variety of related applications including position measurement (such as axial and radial runout or displacement of a rotating assembly) and defect or flaw detection in metallic objects. For example, eddy probe systems are commonly used to detect the lateral position of a rotating shaft in relation to its journal bearing by mounting one or more probes within the bearing in close proximity to the shaft.

Eddy current probes comprise an inductor, or coil, situated at the probe tip driven with a radio frequency (RF) signal which in turn creates a varying magnetic field in any adjacent conductive target material. This magnetic field produces eddy currents in the material that induce a counter-electromotive force (emf) in the eddy probe inductor, thereby altering the effective impedance of the inductor. The impedance of the probe therefore provides an indication of the distance between the target and the probe. Varying the distance of the conductive target element, i.e., the motor shaft, from the coil varies the impedance of the detector coil and thereby varies the output frequency and voltage of the oscillator.

Typically, the impedance output of the probe is not used directly to monitor operating conditions. This is because the impedance of the probe coil is not linearly related to the distance between the coil and the target surface. This can be inconvenient for automated target monitoring because depending on the region of the impedance vs. distance curve the system is operating at, small changes in impedance may indicate much larger changes in distance, or alternatively, large impedance changes may indicate small distance changes.

Thus, rather than compute target position directly from impedance measurements, it is common in the condition monitoring industry to transform the non-linear impedance measurements into a second analog signal, such as 0 to −24 Vdc or 4 to 20 mA, which is linear with target distance. More specifically a two wire proximity transmitter converts the non linear eddy current signal from an eddy current probe into a linearized output suitable for conversion into a 4 to 20 mA process signal. This signal is used to indicate whether a portion of a rotating machine such as a motor or compressor is in need of repair or maintenance. It can also be used to provide protection to the machine by indicating excessive vibration levels, thus allowing an external control system to shut the machine down. The transformation of the eddy current probe output into a linear analog signal suitable for host monitoring equipment has been typically accomplished using a linearization table that is programmed into the transmitter. Such linearization tables are standardized across a range of probe systems, and do not take into account the specific characteristics of a given probe and a given cable. In other words, the same table is typically downloaded into all transmitters without regard to the differences that may exist from system to system.

In some prior art probe systems, a phase locked loop (PLL) oscillator circuit may be used to maintain resonance of an eddy current probe with varying equipment configurations, conductive target materials, and target displacements. A phase locked loop circuit is a circuit which synchronizes an adjustable oscillator with another reference oscillator by the comparison of phase between the two signals. Essentially, the PLL technique is used to stabilize the generated signal used to drive the eddy current probe. Those skilled in the art will appreciate that a PLL is an electronic circuit with a voltage- or current-driven oscillator that is constantly adjusted to match in phase (and thus lock on) the frequency of an input signal. In addition to stabilizing a particular communications channel (keeping it set to a particular frequency), a PLL can be used to generate a signal, modulate or demodulate a signal, reconstitute a signal with less noise, or multiply or divide a frequency.

Two wire eddy current probe position monitoring devices typically have the disadvantage that the power available is limited by the minimum supply voltage and the minimum current consumption. This amount is in the 35 to 40 mW range. One drawback to analog eddy current proximity probes systems of the prior art is that such systems require a complex circuit which is difficult to manufacture and tune, and has an accuracy which is difficult to maintain. Furthermore, individual eddy current probe and cable configurations and target materials require individual tuning of one or both of the oscillator circuit biasing and the variable gain amplifier. More specifically, instrumentation personnel are faced with issues such as transmitter consistency when replacing a broken unit, dependable response over temperature and the need to sometimes maintain several versions of the transmitters for different machines. Further, prior art analog circuits require several component changes to handle different full scale ranges and probe types. These circuits are also prone to performance problems due to component variations. Component variations also required skilled technicians to troubleshoot circuits that had gone out of a proper operating range. This required much time and effort. Prior art circuits were also prone to more drift over temperature which required additional circuitry to compensate for these drifts. This generally limited the temperature range of the transmitter. The need to reduce the time necessary to build a particular transmitter and a way of improving the reliability and quality of the product was the impetus for the new design.

A drawback to PLL systems of the prior art is that these two wire devices typically consume a proportionally large amount of power. Typically, vibration monitoring systems are limited by the minimum supply voltage and the minimum current consumption. This amount is in the 35 to 40 mW range. Phase locked loop circuits can draw as much as 5 to 7 mW which is undesirable in cases where there is a maximum current consumption limitation.

It would therefore be highly desirable to provide a proximity probe/transmitter system that removes the need for a phase locked loop circuit and the electronic circuitry required to implement such a system. Such an improved transmitter would preferably eliminate the need for circuit modification due to equipment configuration changes and also preferably reduce the level of effort and increase the precision associated with system recalibration for different probe geometries and target materials.

SUMMARY OF THE INVENTION

The present invention relates to a digital based two wire proximity transmitter system and a method for calibrating the system with a linearization table uniquely generated to take into account the electrical characteristics of the given probe and cable utilized in a particular system. This new technology allows the unit to be programmed with a unique linearization table for any probe and extension cable along with any normal target material. In other words, rather than utilize the standardized linearization tables of the prior art and hence, the inaccuracies inherent with such standardized tables, each particular system can be customized based on the actual probe/cable configuration utilized in the system. All existing probes and cables can be supported as well as obsolete units from other manufacturers. Different full scale ranges and sensitivities can also be programmed. With the new design, there is only one set of circuitry boards required regardless of the equipment parameters and characteristics. All performance variations are accomplished via software. This greatly reduces cost and ensures that the output from transmitter to transmitter will be consistent which helps improve quality. Along with programmability, onboard temperature sensors can be monitored by the controller and temperature corrections can be applied as necessary to maintain the correct output over a wider temperature range.

Calibration is achieved by connecting the transmitter system i.e., the probe, transmitter and coaxial cable there between, to a calibration system. The calibration system generally includes a control system, such as a control computer, along with a target formed of the desired calibration material and a stepper motor. Prior to generating the linearization table, the transmitter is used to determine the resonant frequency of the probe, cable and calibration target. Once the resonant frequency is determined, this resonant frequency is used to generate the systems unique linearization table. The calibration system controls movement of the target relative to the probe in order to generate the table. Specifically, during calibration, the distance between the probe and required target is incrementally changed by actuation of the stepper motor. At each incremental change, the voltage output of the probe/cable configuration is noted. This result is used to build a table for incremental distances, wherein each distance is characterized by a non-linear output that has been equated to a linear output. This uniquely generated table is subsequently downloaded into the transmitter for reference during monitoring. With this method, any component/electrical variations of the system are accounted for, thus improving the overall accuracy of the system.

More specifically, during calibration, a calibration resonant frequency of an eddy current probe, which includes the cable, is determined relative to the calibration target by sweeping the probe thru a predetermined range of frequencies at a constant distance from the target, where the maximum output is noted. This maximum output, which correlates with the resonant frequency, is then utilized to build the customized linearity table for the probe. The calibration resonant frequency for the transmitter system that is determined during calibration is also downloaded into the transmitter for later comparison to the resonant frequency of the system determined at start up out in the field.

In this regard, during operation, rather than trying to match resonant frequencies on-the-fly, the oscillator of the system is simply driven at a resonant frequency of the system determined upon start up of the transmitter once the system has been installed for operation. This not only removes the need for a phase locked loop but also eliminates the power consumption requirements of a phase locked loop circuit, and thus, the amount of power that is required for the overall monitoring system.

The transmitter of the invention also has the ability to be programmed in the field utilizing the appropriate calibration equipment. None of the vibration monitoring equipment of the prior art are field programmable primarily because they all utilize a standard linearization table that does not take into account differences among individual systems and configurations. This is especially true of prior art analog systems primarily because they are not programmable at all—each system has specific physical circuitry and boards designed for a specific operating parameter. Programmability will allow a user to reconfigure units to any set of parameters as needed. In other words, if a probe or cable is changed out, the system can be re-programmed to download a linearization table customized to the re-configured system. This will be a huge benefit for those who desire to minimize their machinery down time and improve their system accuracy. The calibration equipment can be a replicate of the system to calibrate units in house with maximum accuracy or it can be a simple software download to change the parameters of the transmitter with reduced accuracy.

BRIEF DESCRIPTION OF THE DRAWINGS

FIG. 4b is an illustrative table generated during calibration of the eddy current probe and transmitter system.

DESCRIPTION OF THE PREFERRED EMBODIMENTS

Figure 1A:
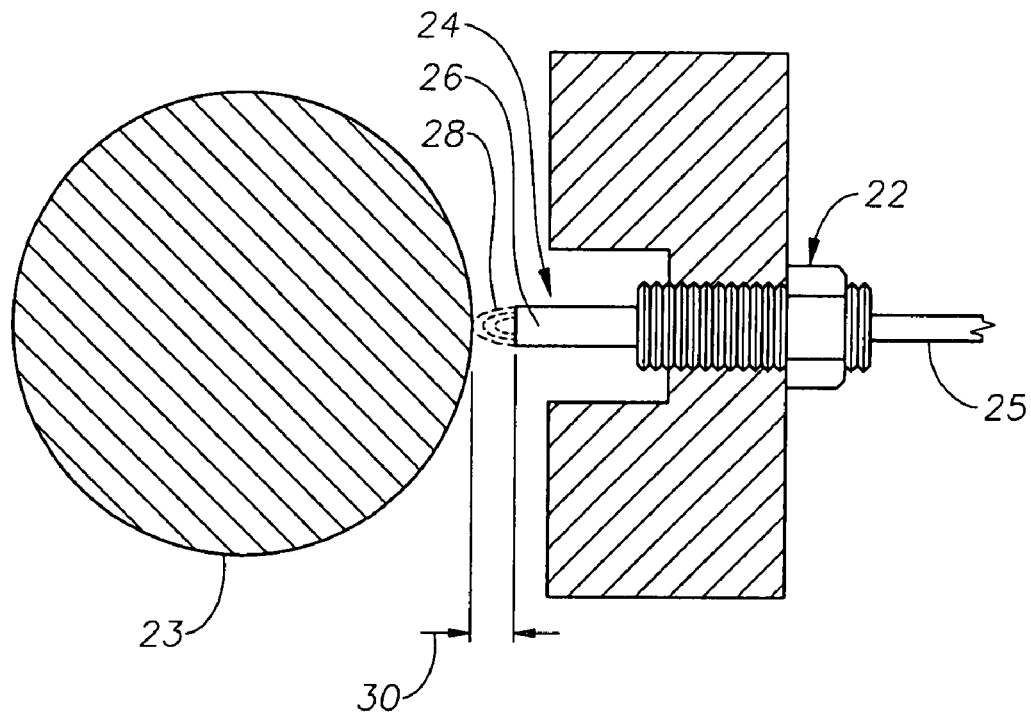
FIG. 1a is a cutaway axial view of an eddy current probe adjacent to a conductive target material.
Figure 1B:
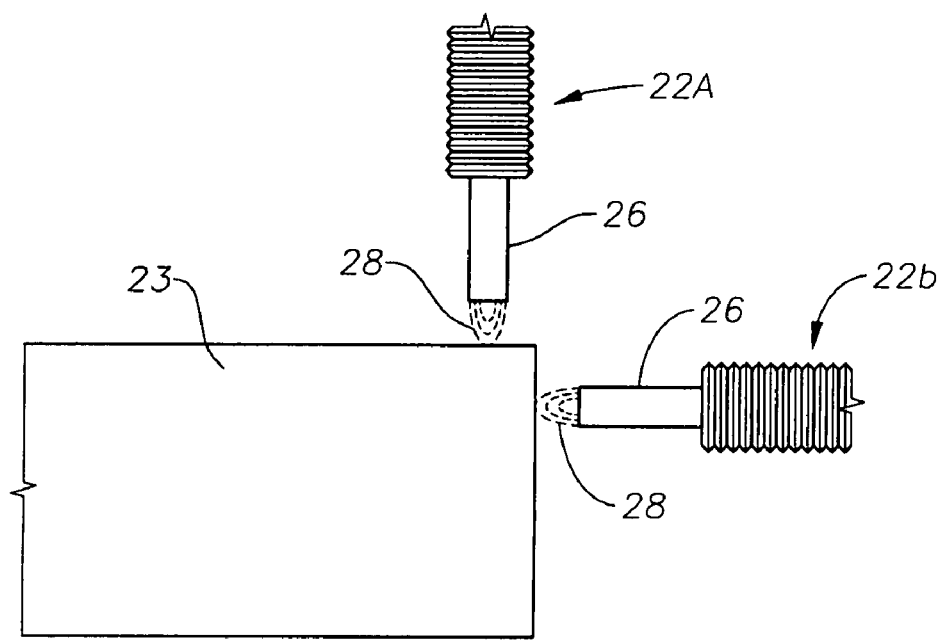
FIG. 1b is a cutaway side view of two eddy current probes adjacent to a conductive target material.

The principles of eddy current probe displacement monitoring is illustrated in FIGS. 1a and 1b. This Figures shows a cross sectional view of an eddy current probe 22 adjacent a target surface 23. At one end 24 of the probe 22 is a coil 26, preferably wound in a flat "pancake" configuration near the probe end 24. A coaxial cable 25 extends from the opposite end of probe 22. When coil 26 is excited with a radio frequency (RF) current, an electromagnetic field 28 penetrates the target surface 23. When the target 23 is conductive, this electromagnetic field induces eddy currents in the target material. These currents produce an additional electromagnetic field which affects the impedance of the coil 26. The magnitude of the eddy currents is dependent on the gap 30 between the probe tip 24 and the target surface 23, and therefore the impedance of the coil 26 is also dependent on the same gap. Measurements of the coil impedance (or, preferably, other parameters affected by coil impedance as explained more fully below) may therefore be utilized to determine the distance of the gap 30. In FIG. 1a, the eddy current probe 22 is illustrated radially positioned adjacent a target shaft 23, while in FIG. 1b, a first eddy current probe 22a is illustrated radially positioned adjacent a target shaft 23, while a second eddy current probe 22b is illustrated axially positioned adjacent a target shaft 23.

Figure 2:
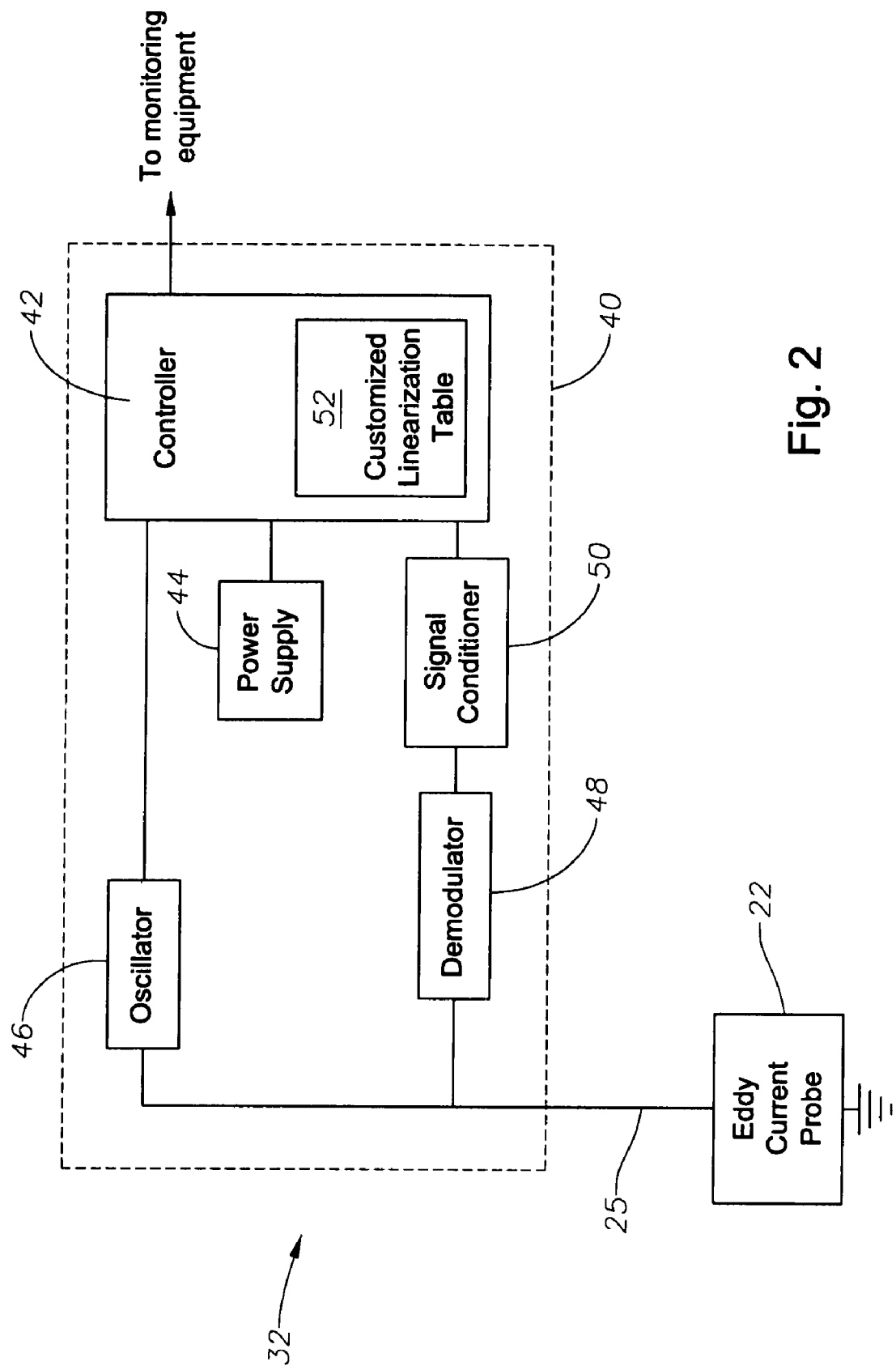
FIG. 2 a schematic of an eddy current probe and transmitter system.

In FIG. 2, a position monitoring system 32 is illustrated. Position monitoring system 32 includes probe 22, cable 25 and a vibration/position transmitter 40. Transmitter 40 typically includes a controller 42, a power supply 44, an oscillator 46, a demodulator 48 and a signal conditioner 50. The RF signal input to probe 22 is generated by oscillator 46 and is typically supplied through cable 25 running between probe 22 and transmitter 40. Those skilled in the art will appreciate that eddy current probe 22 and coaxial cable 25 form a resonant circuit. When such a resonant circuit is driven at its resonant frequency (generated by transmitter 40) the load impedance of the circuit is purely resistive.

Transmitter 40 also includes a customized linearization table 52 that has been downloaded or otherwise programmed into controller 42. As discussed herein, part of the novelty of the invention is this customized linearization table 52. The term "customized" is used to indicate that the linearization table has been uniquely generated for the particular probe 22 and cable 25 combination utilized in the overall position monitoring system 32. Those skilled in the art will appreciate that each eddy current probe and each coaxial cable utilized therewith are characterized by its own unique impedance properties. When each of these components is combined as part of an overall system, then the overall system is further characterized by unique resistive properties. To alter one of the components of the system will therefore result in a change to the impedance properties of the overall system. As will be described in more detail below, customized linearization table 52 is generated and utilized to account for the unique impedance properties of a particular position monitoring system 32.

Figure 3:
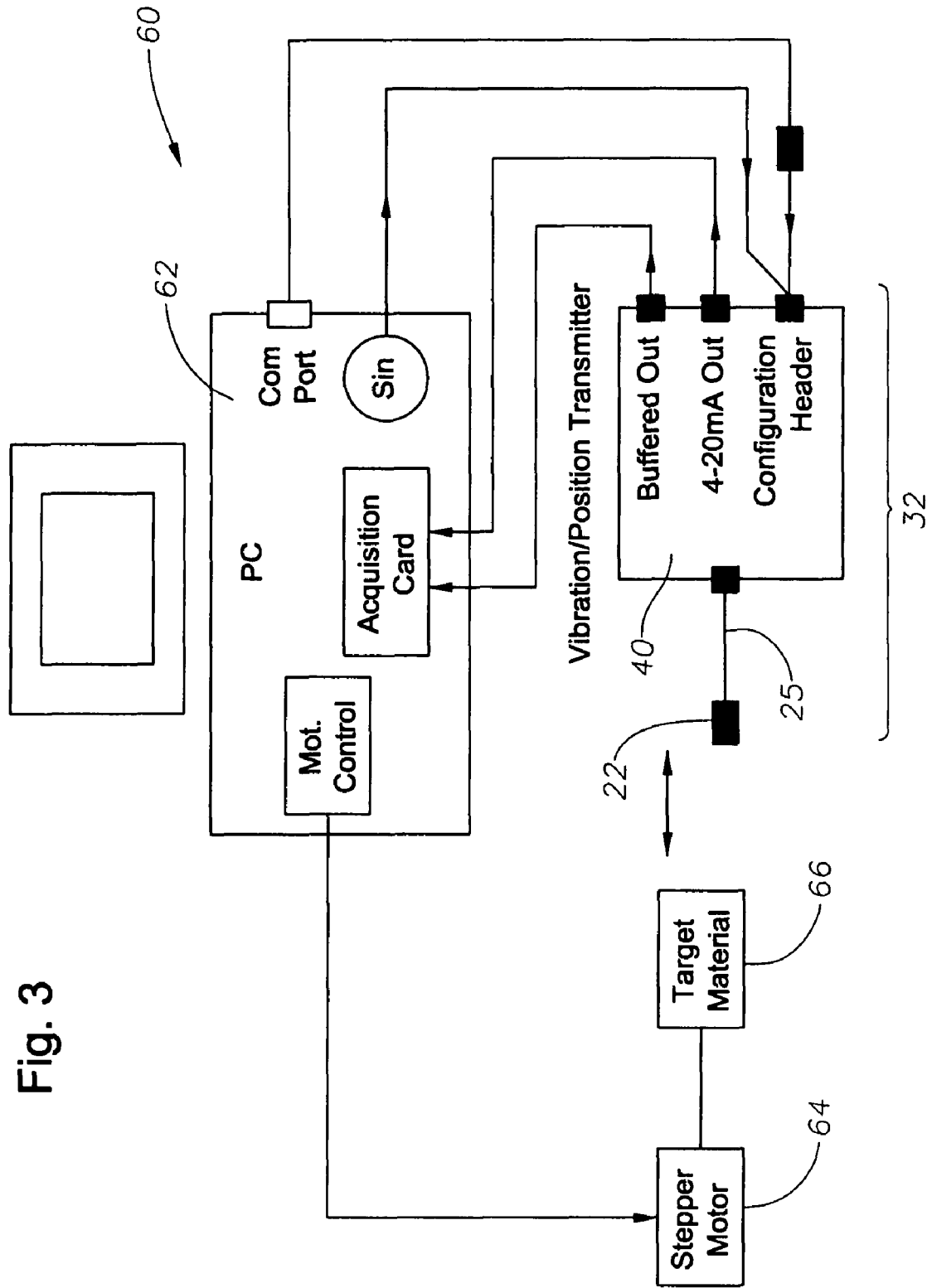
FIG. 3 is a schematic diagram of the eddy current probe and transmitter system during calibration.

In FIG. 3, a calibration system 60 is illustrated. It is this calibration system 60 that is utilized to generate the foregoing customized linearization table 52. While calibration system 60 may be internal or external to transmitter 40, in the illustrated embodiment, calibration system 60 comprises an external computer 62. As is shown, calibration system 60 controls a stepper motor 64 which drives a calibration target 66. While target 66 will be referred to as a rotatable motor shaft, it could comprise any moving target for which vibration or position monitoring is desired. In any event, as will be described in more detail below, system 60 drives motor 64 so as to cause incremental movement of target 66, thereby permitting customized calibration of transmitter 40.

Turning back to FIGS. 1 and 2, those skilled in the art will appreciate that one common use for the foregoing position monitoring system 32 is to monitor rotation of a shaft, such as target 23, mounted in a sleeve bearing (not shown). As a shaft rotates, it naturally rides somewhat unevenly within the bearing, periodically traveling closer to and farther from the end of the eddy current probe. As discussed above, these variations in the gap 30 width between the probe tip 24 (FIGS. 1a and 1b) and the surface of the target/shaft 23 produce changes in the impedance of the probe 22, and hence the voltage output of probe 22.

In the transmitter 40 of the invention, the RF signal is applied to the transmitter probe input by oscillator 46. It can be appreciated that when the frequency of the RF signal generated by the oscillator 46 coincides with the resonant frequency of the probe 22/cable 25 apparatus, the output voltage of the oscillator yields a purely resistive load impedance of the probe 22/cable 25 apparatus. However, as eddy current induced changes in probe/cable load impedance occur, the result is changes in the voltage output of the probe 22. In other words, the oscillator 46 drives the probe 22/cable 25 apparatus at resonance, and the potential between the oscillator 46 output and the probe input is monitored as the resistive load impedance of the probe 22/cable 25 system varies relative to the fixed resistance there between.

Only the peak amplitude, i.e., resonance, of the RF signal energizing probe 22 is of interest. It is the output of probe 22 at this peak amplitude that varies as the probe 22/cable 25 system impedance varies. The high frequency RF AC signal must therefore be demodulated into a varying DC signal which fluctuates in value as the target to probe distance fluctuates. This function is performed by demodulator 48, which can take numerous different forms that are well known in the art. Following demodulation, the signal is conditioned with a signal conditioning circuit 50.

In the preferred embodiment, oscillator 46 is a voltage controlled oscillator (VCO) which provides an RF square wave signal with a peak amplitude of approximately 3 Vdc at its output. The VCO output is controlled by controller 42. Those skilled in the art will appreciate that while oscillator 46 is described as a VCO, oscillator 46 can take any form so long as it provides a energizing frequency to probe 22. While the prior art teaches that it is necessary to use a PLL with a phase detector and voltage controlled oscillator to maintain an in-phase relationship between the voltage across an eddy current probe and an oscillator, it has been found that any frequency shift in the resonant frequency of the probe/cable system based on operating conditions is negligible and that driving the oscillator at the predetermined resonant frequency, i.e., a fixed oscillation frequency, yields acceptable results. Rather, it is the customized linearity table that has a far greater impact on the accuracy of the system in monitoring changes in probe-target separation.

In operation VCO 46 is used to excite probe 22 by supplying a square wave voltage output to probe 22 via cable 25. This signal goes to the probe 22. Probe 22 generates an output which is demodulated and passed to a signal conditioner, such as an A/D converter. An A/D converter 50 receives the output from the demodulator 48 and converts the analog output signal to a corresponding series of digital samples. Analog-to-digital (A/D) as well as digital-to-analog (D/A) converters are in widespread use and suitable commercial embodiments are well known to those of ordinary skill in the art. The conditioned signal then goes to the controller 42. Controller 42 performs the linearization and if necessary, peak to peak detection of the input signal. It also provides output voltages for the 4 to 20 mA current circuit as well as voltages to drive the buffered output.

In one preferred embodiment, controller 42 is a digital signal processor (DSP) disposed for receipt of the digital signal. The digital samples output from converter 50 are input to controller 42 via a standard SSI interface. The DSP 146 converts each digital sample into a second digital value based on the customized linearization table described herein. Preferably, the customized linearization table and resonant frequency data is stored in a standard memory device such as an EEPROM, which interfaces with the DSP. At run time, the table or a portion of the table stored in the EEPROM may be downloaded into the internal RAM of the DSP. In any event, the converted values from controller 42 are further conditioned to provide an appropriate signal to host monitoring equipment. Many suitable digital signal processors are well known and commercially available.

While one benefit to the customized linearity table of the invention is that it yields more accurate results, another benefit is that it obviates the need mathematical modeling in the DSP or the need to conduct on-the-fly arithmetic calculations in order to determine a linearized output suitable for monitoring by the monitoring equipment. Such a method is known to require complex computation which is both time consuming and relatively expensive to implement.

Figure 4A:
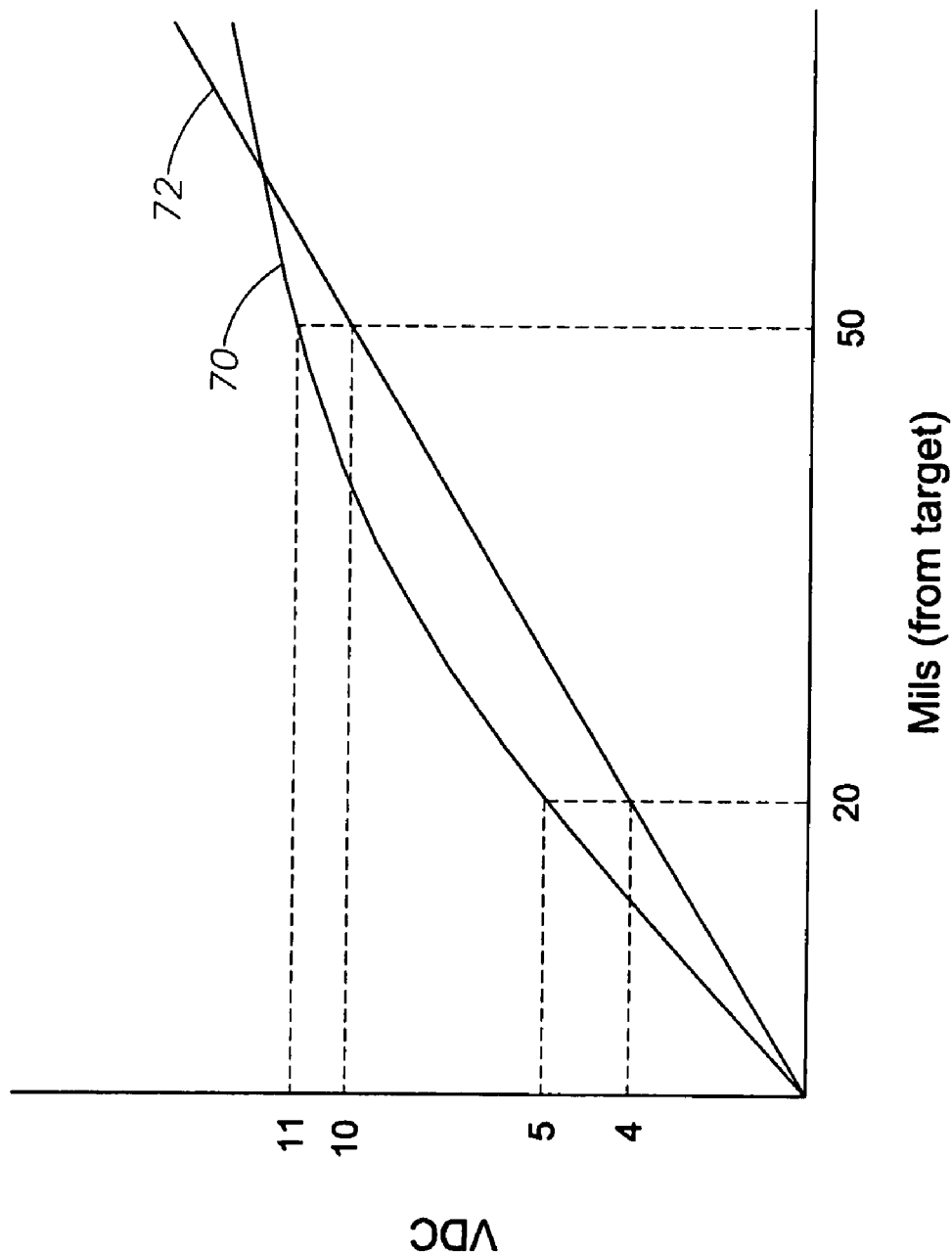
FIG. 4a is an illustrative linearization graph utilized during calibration of the eddy current probe and transmitter system.

FIGS. 4a and 4b illustrate an example of a linearization graph and linearization table as described herein. For illustrative purposes only, utilizing the linearization graph of FIG. 4a, line 70 represents a non-linear input, while line 72 represents a linear output voltage. It is known that at a distance of 20 mils from the target, a 4 volt output is desired, while at 50 mils from the target, a 10 volt output is desired. During calibration, at 20 mils, a 5 volt output is recorded, while at 50 mils, an 11 volt output is recorded. Thus, moving the target through a distance range, the non-linear input of a probe can be synchronized with a linear output to yield a table such as is shown in FIG. 4b. During monitoring operations, if a 5 volt nonlinear output is received from probe 22 (after demodulation), transmitter 40 needs to send a 4 volt linear output to the monitoring equipment. Likewise, if an 11 volt non-linear output is received from probe 22, then transmitter 40 needs to send a 10 volt linear output to the monitoring equipment.

With particular reference to FIG. 4b, it is seen that Column A represents a range of gap distances of a probe from a calibration target. Associated with each distance is a non-linear input voltage, such as is shown in Column B, which represents the voltage change across the probe. Column C represents the converted analog to digital counts, while Column D represents the desired linearized output. Thus, based on the non-linear input voltage associated with a particular distance, a linear output voltage is generated for a gap distance. In the illustrative example, for a gap distance of 30 mils, an input voltage of 1.12915 volts yields a linearized output of 0.5999 volts, while a gap distance of 31 and an input voltage of 1.148071 yields a linearized output of 0.6201 volts.

The various operational steps of the foregoing system will now be described. Prior to initiation of monitoring operations, the transmitter 40 must perform startup steps to ensure the VCO drives system 32 at resonance. First, transmitter 40 applies temperature corrections for both the VCO voltage and the input offset voltage. Preferably, these known correction quantities are stored in the memory of controller 42 along table 52. Once these corrections have been applied, transmitter 40 then proceeds to find the resonance of the probe 22/cable 25 system. This is preferably accomplished by sweeping the oscillator through its range of usable frequencies and identifying the peak output of the probe 22/cable 25 system. In one preferred embodiment, this procedure may be performed multiple times to find the average resonance peak. In one illustrative example, the peak is identified through 64 sweeps and the average peak is determined. Transmitter 40 will then takes this VCO resonant frequency and compare it to a baseline VCO resonant frequency obtained during calibration. This is used obtain a correction for the probe impedance. This correction is applied to the offset to get the output from a probe to be closer to the standard if necessary.

After the initial correction period, transmitter 40 will then begin to sample the A/D input to controller 42. The input corresponds to the customized linearization table values. This table value is then used to drive digital-to-analog output as well as decide a peak to peak value.

In one preferred embodiment, an averaging filter is used with the output. The averaging filter prevents the 4 to 20 mA output from becoming 'jittery' if subsequent peak values are slightly different from each other. This output then drives a 4 to 20 mA output circuit (not shown).

In any event, controller 42 compares a linearized value from customized table 52 to predefined limits. When the linearized value exceeds these limits, then the 4 to 20 mA output circuit is driven low. This indicates that there is may be problem with the probe/cable.

At calibration, the system is calibrated to a particular probe model number (which includes the cable). First, the correct VCO value, i.e., the resonant frequency must be chosen. The probe is then positioned adjacent the target 66, preferably approximately 50 mils from the target. The VCO is then swept through a range of frequency values and the peak output is noted. The customized linearity table can then be generated.

PC 62 will operate stepper motor 64 to cause the target 66 to be moved in one mil increments over the desired gap range and take readings at those increments. Preferably, the initial gap is approximately 0 mils and the target 66 is moved away from probe 22 in one mil increments. In any event, the output from probe 22 is used to generate table 52 that is downloaded into transmitter 40. This table may be verified in 5 mil increments. Preferably, the difference between subsequent values obtained should be within 5% of an ideal difference.

While certain features and embodiments of the invention have been described in detail herein, it will be readily understood that the invention encompasses all modifications and enhancements within the scope and spirit of the following claims.

What is claimed is:

1. An apparatus for monitoring the position of a conductive target, said apparatus comprising:

a. an eddy current probe, wherein said eddy current probe comprises an inductor which can be positioned near said conductive target;

b. an oscillator connected to said inductor, said oscillator being capable of generating a frequency to excite said inductor;

c. a cable electrically connecting said oscillator to said probe, said cable and said probe forming a resonant circuit having a particular probe identification and a resonant frequency;

d. a demodulator connected to said eddy current probe, said demodulator capable of receiving an input from the eddy current probe and generating an output;

e. an analog to digital converter connected to said demodulator, said analog to digital converter capable of receiving the output from the demodulator; and f. a table unique to the particular probe identification utilized in the apparatus, said table generated based on the resonant frequency of a probe and cable configuration having the particular probe identification.

2. The apparatus of claim 1, wherein the output from the demodulator comprises a peak voltage across said inductor and wherein said peak voltage has a first functional dependence on the position of said conductive target relative to said inductor; and wherein the analog to digital converter is capable of digitizing said demodulator output to produce a first set of digital data; and wherein said table comprises the first set of digital data and a second set of digital data, wherein the second set of digital data has a fixed dependence on the first set of digital data.

3. The apparatus of claim 2, further comprising a digital to analog converter having as an input said second set of digital data and as an output an analog signal which has a second functional dependence on the position of said conductive target relative to said inductor, wherein said second functional dependence is substantially linear.

4. An apparatus for monitoring the position of a conductive target, said apparatus comprising:

a. an eddy current probe, wherein said eddy current probe comprises an inductor mounted near said conductive target;

b. an oscillator connected to said inductor;

c. a cable electrically connecting said oscillator to said probe, said cable and said probe forming a resonant circuit having a particular probe identification and a resonant frequency;

d. a demodulator having an output comprising the peak voltage across said inductor wherein said peak voltage has a first functional dependence on the position of said conductive target;

e. an analog to digital converter capable of digitizing said demodulator output to produce a first set of digital data;

f. a table unique to the particular probe identification utilized in the apparatus and generated based on the interaction of the determined resonant frequency of a probe and cable configuration having the particular probe identification utilized in the apparatus said table comprising the first set of digital data and a second set of digital data, wherein the second set of digital data has a fixed dependence on the first set of digital data; and g. a digital to analog converter having as an input said second set of digital data and as an output an analog signal which has a second functional dependence on the position of said conductive target, wherein said second functional dependence is substantially linear.

5. A method for monitoring the position of a conductive target, said method comprising the steps of:

a. providing a table comprising a first set of digital data and a second set of digital data, wherein the second set of digital data has a fixed dependence on the first set of digital data b. positioning an eddy current probe adjacent a conductive target;

c. exciting an oscillator to generate a voltage from an inductor in the eddy current probe;

d. identifying a peak voltage across the inductor wherein the peak voltage has a first functional dependence on the position of said conductive target relative to the inductor;

e. generating an analog output based on the peak voltage across the inductor;

f. converting the analog output to a digital output to produce a first set of digital data;

g. comparing the first set of digital data to the table to identify the corresponding second set of digital data; and h. converting the second set of digital data into an analog output so as to have a second functional dependence on the position of said conductive target, wherein said second functional dependence is substantially linear, i. wherein, said table is generated based on the steps of:

j. determining the electrical resonant frequency of the eddy current probe;

k. positioning an eddy current probe with an inductor a first distance from a conductive target;

l. exciting an oscillator at the resonant frequency to generate a first voltage from an inductor in the eddy current probe;

m. producing a first output from said inductor based on the first voltage; digitizing and storing said first output;

n. changing the relative distance between the eddy current probe and the conductive target to a second distance;

o. exciting the oscillator at the resonant frequency to generate a second voltage from the inductor in the eddy current probe;

p. producing a second output from said inductor based on the second voltage;

q. digitizing and storing said second output;

r. repeating steps n through q until a desired range of distances between the conductive target and the eddy current probe has been achieved; and s. utilizing said first output, said second output and any subsequent output from steps m and p as the first set of digital data and computing a second set of digital data based thereon.

6. The method of claim 5, wherein said table is programmed into a transmitter attached to said eddy current probe.

7. The method of claim 5, wherein the step of changing the relative distance between the eddy current probe and the conductive target comprises the step of moving the conductive target.

8. The method of claim 7, wherein the eddy current probe is axially positioned relative to said conductive target and said conductive target is moved axially relative to said eddy current probe.

9. The method of claim 7, wherein the eddy current probe is radially positioned relative to said conductive target and said conductive target is moved radially relative to said eddy current probe.

10. A method for monitoring the position of a conductive target, said method comprising the steps of:

a. providing a table comprising a first set of digital data and a second set of digital; data, wherein the second set of digital data has a fixed dependence on the first set of digital data b. positioning an eddy current probe having an inductor adjacent a conductive target;

c. exciting an oscillator at a first frequency to generate a first output voltage from the inductor in the eddy current probe;

d. changing the output frequency of the oscillator to a second frequency different from the first frequency;

e. exciting said oscillator at the second frequency to generate a second output voltage from the inductor in the eddy current probe;

f. repeating steps d through e until a desired range of frequencies from said oscillator has been achieved and a range of output voltages has been generated; and g. determining the electrical resonant frequency of the eddy current probe based on said range of output voltages;

h. exciting said oscillator at said electrical resonant frequency to generate a first monitored output voltage from the inductor in the eddy current probe;

i. generating an analog output based on the first monitored output voltage across the inductor;

j. converting the analog output to a digital output to produce a first set of digital data;

k. comparing the first set of digital data to the table to identify the corresponding second set of digital data; and l. converting the second set of digital data into an analog output so as to have a second functional dependence on the position of said conductive target, wherein said second functional dependence is substantially linear.

11. The method of claim 10, wherein said step of determining electrical resonant frequency is achieved by identifying the peak voltage across the inductor, identifying the input frequency associated with said peak voltage and designating said input frequency identified with said peak voltage as the electrical resonant frequency.

* * * * *